United States Patent [19]

Tajima

[11] Patent Number: 5,768,000
[45] Date of Patent: Jun. 16, 1998

[54] WAVELENGTH MULTIPLEXING OPTICAL TRANSMISSION DEVICE

[75] Inventor: Tsutomu Tajima, Tokyo, Japan

[73] Assignee: NEC Corporation, Tokyo, Japan

[21] Appl. No.: 777,349

[22] Filed: Dec. 27, 1996

[30] Foreign Application Priority Data

Dec. 28, 1995 [JP] Japan .................. 7-342123

[51] Int. Cl.$^6$ .................. H04B 10/17; H04J 14/02
[52] U.S. Cl. .................. 359/177; 359/179; 359/124; 359/133; 359/161
[58] Field of Search .................. 359/124–125, 359/133, 161, 177, 174, 179

[56] References Cited

U.S. PATENT DOCUMENTS

| | | | |
|---|---|---|---|
| 5,396,360 | 3/1995 | Majima | 359/161 |
| 5,463,487 | 10/1995 | Epworth | 359/124 |
| 5,644,423 | 7/1997 | Iwano | 359/177 |

FOREIGN PATENT DOCUMENTS 0 637 148  2/1995  European Pat. Off. .

06 338874  12/1994  Japan .

*Primary Examiner*—Leslie Pascal
*Attorney, Agent, or Firm*—Young & Thompson

[57] ABSTRACT

In a wavelength multiplexing optical transmission device, first and second optical transmission boards output optical signals which have wavelengths different from each other and on which different sine-wave signals are superposed. The optical signals are coupled by an optical coupler, then divided into two lights by an optical divider. One optical signal is amplified by an optical amplifier, the other optical signal is converted into an electrical signal by a photodiode. The sine-wave signal components are extracted by first and second bandpass filters with the existence of the extracted signals being detected by output detectors. An adder output a reference voltage signal with a voltage according to the number of signals detected. A gain control circuit controls the amplification gain based on a voltage value corresponding to the intensity of an optical signal to be output and the reference voltage value, so that the level of output light can be controlled according to the number of optical signals.

3 Claims, 3 Drawing Sheets

WAVELENGTH MULTIPLEXING OPTICAL TRANSMISSION DEVICE

FIELD OF THE INVENTION

This invention relates to a wavelength multiplexing optical transmission device which outputs a wavelength-multiplexed optical signal, and more particularly to, a wavelength multiplexing optical transmission device which outputs an optical signal while amplifying it by an optical amplifier whose gain is controlled based on an optical intensity of light to be output.

BACKGROUND OF THE INVENTION

In a conventional optical transmission device which outputs an optical signal after amplifying it by an optical amplifier, the gain of the optical amplifier is controlled such that the optical intensity of output light becomes constant. In an optical amplifier in which an optical signal can be directly amplified as it is by using a rare-earth-element-doped fiber such as an erbium-doped fiber, an optical signal with wavelength-multiplexed light which includes wavelengths different from each other can be amplified in a lump. When using such an optical amplifier, it is necessary for the amplification gain of the optical amplifier to be set such that the optical intensity of optical signal for each of the multiplexed wavelengths comes to a constant reference value.

However, when the amplification gain is controlled to make constant the optical intensity of output light of an optical amplifier, the optical intensity of the optical signal for each wavelength may be varied, depending on the number of optical signals to be wavelength-multiplexed. For example, if the number of optical signals to be wavelength-multiplexed is increased under the gain control such that the optical intensity of output light is controlled to be constant, the optical intensity for one wavelength after amplification must be reduced. Because of this, there have been developed various devices in which the gain is controlled such that the optical intensity of optical signals for each wavelength becomes constant.

Japanese patent application laid-open No. 4-78827(1992) discloses a wavelength multiplexing optical transmission device in which a light for controlling the amplification gain other than a plurality of optical signals for transmitting information is wavelength-multiplexed. In this device, adding to the optical signals for transmitting information, a predetermined optical signal for controlling the amplification gain is wavelength-multiplexed, and these are amplified by an optical amplifier. Then, by wavelength-dividing and extracting only the light for controlling the amplification gain of optical signals after amplification, the amplification gain of the optical amplifier is controlled such that the optical intensity becomes constant. Herein, since the gain is controlled on only the light for controlling the gain, even if the number of optical signals for transmitting information is varied, the optical intensity of optical signals for each wavelength does not change.

Furthermore, Japanese patent application laid-open No. 4-362617(1992) discloses a wavelength multiplexing optical transmission device in which an optical signal after amplification is divided into two optical signals and the amplification gain of an optical amplifier is then controlled based on a baseband signal obtained by demodulating one of the divided optical signals. In this device, the divided optical signal after amplification is demodulated into the baseband signal by heterodyne detection, homodyne detection or direct detection by an optical filter, and the gain is controlled on a peak value of the baseband signal. Thus, if a baseband signal component is included in an optical signal with a wavelength, the peak value of the baseband signal to be extracted from the optical signal after the amplification corresponds to the optical intensity of the optical signal including the baseband signal after the amplification. Accordingly, if the amplification gain is controlled on the peak value of the baseband signal, even if the number of lights to be wavelength-multiplexed is varied, the optical intensity of light per each wavelength after the amplification can be kept constant.

As described above, if only the component corresponding to one of optical signals to be wavelength-multiplexed after amplification is extracted and the amplification gain of an optical amplifier is then controlled on the component, the optical intensity of optical signals each wavelength after the amplification can be kept constant, regardless of the number of optical signals to be wavelength-multiplexed.

However, if an optical signal as a reference of gain control is interrupted, there happens a problem that the gain control can be no longer conducted.

SUMMARY OF THE INVENTION

Accordingly, it is an object of the invention to provide a wavelength multiplexing optical transmission device by which the optical intensity of optical signals for each wavelength after amplification can always be kept constant, regardless of the number of optical signals to be wavelength-multiplexed.

According to the invention, a wavelength multiplexing optical transmission device, comprises:

a plurality of optical transmission means which comprises means for superposing a sine-wave signal with a predetermined frequency on a main signal which represents information to be transmitted and means for outputting an optical signal whose optical intensity is varied according to an output signal of the superposing means, each of the plurality of optical transmission means being assigned a frequency of the sine-wave signal and a wavelength of the optical signal both of which are different from each other;

means for multiplexing the optical signal output from the optical transmission means;

means for optically dividing the multiplexed optical signal into two optical signals;

an electrical-optical transducing means which receives one of the two optical signals output from the optical dividing means and which outputs an electrical signal according to an optical intensity of the received optical signal;

means for extracting a signal component corresponding to the sine-wave signal superposed by the superposing means with respect to each of frequency component of the sine-wave signal from the electrical signal output from the electrical-optical transducing means;

means for detecting whether or not the output of the signal component extracting means exists with respect to each frequency component of the sine-wave signal;

means for accumulating the number of the sine-wave signal whose output is detected by the detecting means;

means for optically amplifying the other of the two lights output from the optical dividing means; and means for setting an amplification gain of the optical amplifying means on an intensity of an optical signal output from the optical amplifying means and the number of the sine-wave signal accumulated by the signal number accumulating means.

As defined above, on each of optical signals to be coupled while being wavelength-multiplexed, sine-wave signals which are different from each other are superposed. Then, one of the coupled optical signals which is thereafter divided is amplified by the optical amplifying means, the other is converted into an electrical signal. From this electrical signal, a sine-wave signal component for each frequency to be wavelength-multiplexed is extracted, thereby obtaining the number of the extracted sine-wave signal components. Then, the amplification gain of the optical amplifying means is controlled on the intensity of the optical signal output from the optical amplifying means and the number of the extracted sine-wave signal components. Thus, since the sine-wave signals which are different from each other are superposed on each of the optical signals to be wavelength-multiplexed, the number of the multiplexed optical signals can be recognized by detecting the number of the sine-wave signal components which are included in the multiplexed optical signal. Accordingly, the amplification gain of the optical amplifying means can be controlled according to the number of optical signals to be multiplexed.

On the other hand, the amplification gain setting means may change the amplification gain of the optical amplifying means based on the intensity of the optical signal output from the optical amplifying means and the number of the sine-wave signals accumulated by the signal number accumulating means, so that an optical intensity of an optical signal corresponding to one wavelength which is included in the optical signal output from the optical amplifying means can be controlled to be a predetermined reference value.

Namely, based on the intensity of the optical signal output from the optical amplifying means and the number of signals (i.e., the number of optical signals to be multiplexed) obtained by the signal number accumulating means, the amplification gain of the optical amplifying means can be controlled such that the optical intensity per one wavelength optical signal is kept to be constant. Therefore, even if the number of optical signals to be multiplexed is varied, the optical intensity for one optical signal after amplification can be kept constant.

Further, the signal number accumulating means may comprise an operational amplifier which outputs a reference signal with a voltage according to the number of the sine-wave signal whose output is detected by the detecting means, and the amplification gain setting means may comprise an optical intensity detecting means which outputs a voltage signal according to the intensity of the optical signal output from the optical amplifying means, means for comparing the voltage signal output from the optical intensity detecting means with the voltage of the reference signal output from the operational amplifier, and means for changing an amplification gain of the optical amplifying means on a comparison result by the comparing means such that the voltage signal output from the optical intensity detecting means coincides with the voltage of the reference signal output from the operational amplifier.

Namely, by outputting the reference signal with a voltage according to the number of the extracted sine-wave signals from the operational amplifier, the amplification gain of the optical amplifying means can be controlled such that the voltage signal output from the optical intensity detecting means coincides with the voltage of the reference signal output from the operational amplifier. Since the voltage of the reference signal is increased with an increase in the number of optical signals to be multiplexed, the gain can be changed such that the intensity of optical signal after amplification is increased according to this. Therefore, even if the number of optical signals to be multiplexed is varied, the optical intensity for one optical signal after amplification can be kept constant.

Furthermore, the optical amplifying means may comprise a rare-earth-element-doped fiber to which an optical signal to be amplified is input, and an exciting light source which supplies the fiber with exciting light, and the amplification gain setting means may control an intensity of the exciting light output from the exciting light source on an intensity of an optical signal output from the fiber and the number of the sine-wave signal accumulated by the signal number accumulating means.

Namely, the optical amplifying means may be a direct optical amplifier in which a rare-earth-element-doped fiber such as an erbium-doped fiber is employed, and the amplification gain can be controlled by changing the intensity of the exciting light to be supplied with the rare-earth-element-doped fiber.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
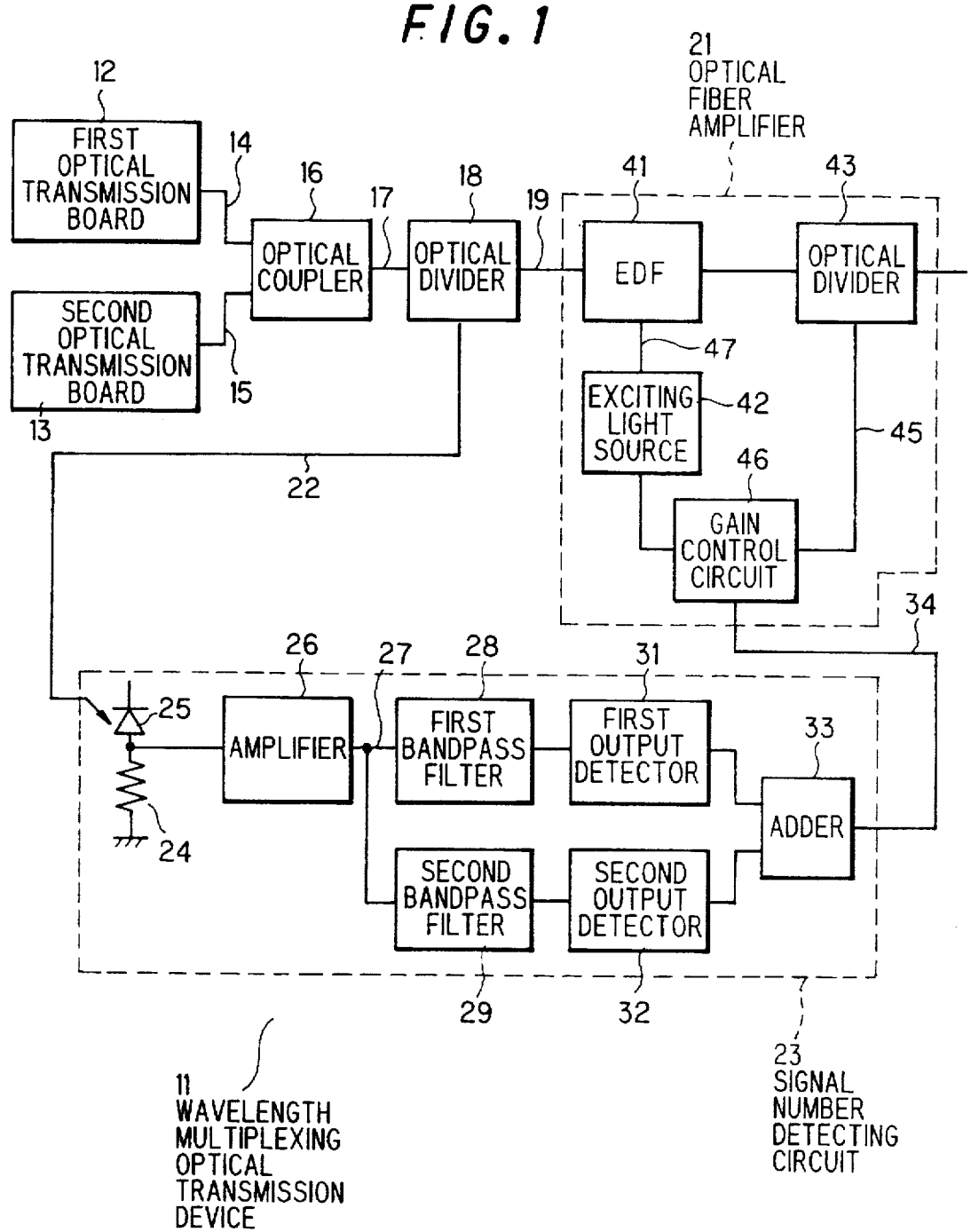
FIG. 1 is a block diagram showing a wavelength multiplexing optical transmission device in a preferred embodiment according to the invention.

A wavelength multiplexing optical transmission device in the preferred embodiment according to the invention will be explained in FIG. 1, wherein a whole schematic circuit composition of the device is shown.

The wavelength multiplexing optical transmission device 11 is provided with first and second optical transmission boards 12, 13 which output optical signals with wavelengths different from each other. The first and second optical transmission boards 12, 13 output optical signals that sine-wave signals with first and second frequencies which are different from each other are superposed on the amplitude of a row of optical digital main signals which represents information to be transmitted. The lights 14, 15 output from the first and second optical transmission boards 12, 13 are input to an optical coupler 16 by which these lights are wavelength-multiplexed. Light 14 output from the optical coupler 16 is input to an optical divider 18 by which it is divided into two lights.

One light 19 output from the optical divider 18 is input to an optical fiber amplifier 21 in which it is amplified. The other light 22 output from the optical divider 18 is input to a signal number detecting circuit 23 in which the number of wavelength-multiplexed optical signals is detected. The signal number detecting circuit 23 comprises a photodiode 25 for converting the input optical signal 22 into an electrical signal which is connected with a resistor 24 at its end, and an amplifier 26 which converts the optical current output from the photodiode 25 into a voltage signal and amplifies the voltage signal. The voltage signal 27 output from the amplifier 26 is input to a first bandpass filter 28 for extracting the sine-wave signal component with the first frequency which is included in the optical signal 14 output from the first optical transmission board 12 and a second bandpass filter 29 for extracting the sine-wave signal component with the second frequency which is included in the optical signal 15 output from the second optical transmission board 13.

First and second output detectors 31, 32 are circuits for detecting the output from the corresponding bandpass filter. Namely, they detect whether or not the sine-wave signal component is extracted by the corresponding bandpass filter, in other words, whether or not the optical signal superposed by the sine-wave signal exists in the optical signal 22 coupled by the optical coupler 16. An adder 33 is an operational amplifier circuit for accumulating the number of signals detected by the first and second output detectors 31, 32. The operational amplifier circuit which composes the adder 33 outputs a reference voltage signal 34 with a voltage according to the number of the detected signals.

The optical fiber amplifier 21 comprises an erbium-doped fiber (EDF) 41 to which the light 19 output from the optical divider is input, an exciting light source 42 for supplying EDF 41 with exciting light, and an optical divider 43 by which the light output from EDF 41 is divided into two lights. One light output from the optical divider 43 is output light 44 from the wavelength multiplexing optical transmission device 11. The other light 45 output from the optical divider 43 is input to a gain control circuit 46 for controlling the amplification gain. Also, the reference voltage signal 34 output from the adder 33 of the signal number detecting circuit 23 is input to the gain control circuit 46.

The gain control circuit 46 recognizes how many wavelength lights are wavelength-multiplexed in the optical signal to be currently amplified, and controls the intensity of the exciting light 47 output from the exciting light source 42 based on the number of wavelength-multiplexed lights and intensity of the optical signal which is wavelength-multiplexed after amplification to keep constant the optical intensity for one wavelength optical signal.

Figure 2:
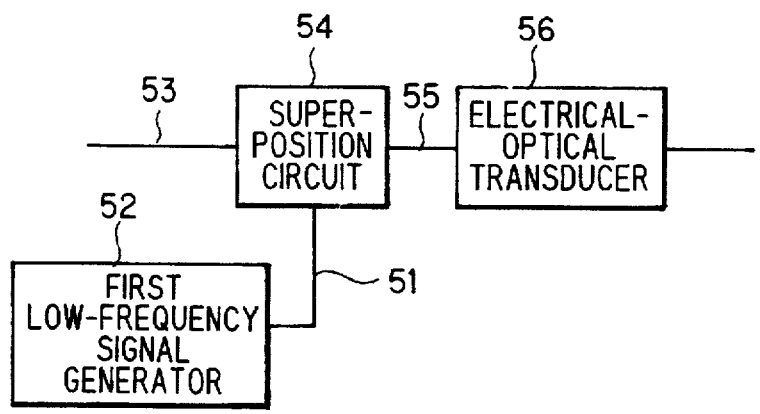
FIG. 2 is a block diagram showing a schematic circuit composition of a first optical transmission board in FIG. 1.

FIG. 2 shows a composition of the first optical transmission board 12 shown in FIG. 1. The first optical transmission board 12 comprises a first low-frequency signal generator 52 which generates a low-frequency sine-wave signal 51 with a first frequency, a superposition circuit 54 in which the low-frequency sine-wave signal 51 is superposed on a main signal 53 which represents digital information to be transmitted, and an electrical-optical transducer 56 which outputs an optical signal with the first frequency whose optical intensity is modulated according to the amplitude of an electrical signal 55 output from the superposition circuit 54. The composition of the second optical transmission board 13 is similar to that of the first optical transmission board 12. Meanwhile, a low-frequency signal generator of the second optical transmission board 13 outputs a low-frequency sine-wave signal with a second and an electrical-optical transducer thereof outputs an optical signal with the second frequency.

Figure 3:
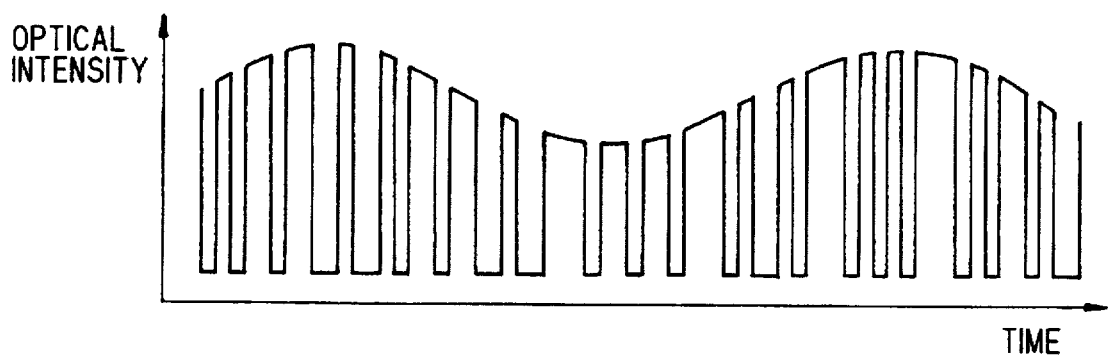
FIG. 3 shows a waveform of an optical signal output from the first transmission board in FIG. 1.

FIG. 3 shows an example of the optical signal output from the first optical transmission board 12, wherein the abscissa axis represents the process of time and the ordinate axis represents a variation in the optical intensity of optical signal. In the optical signal output from the first optical transmission board 12, the low-frequency sine-wave signal with the first frequency is superposed on a variation in the amplitude on the main signal.

Figure 4:
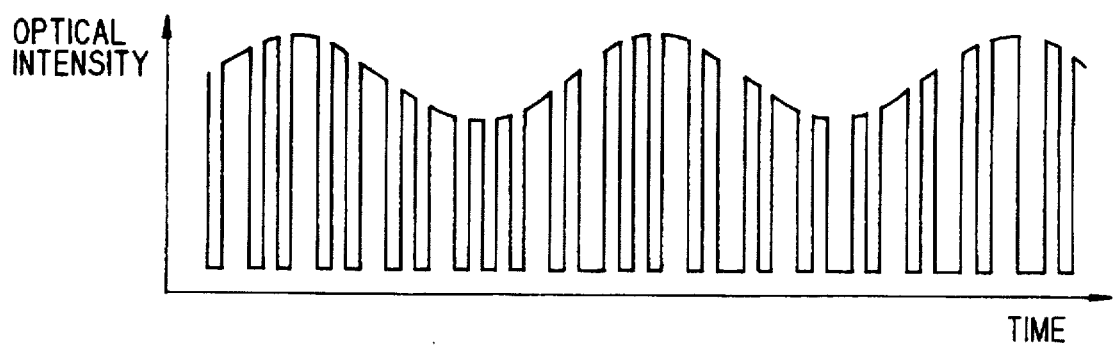
FIG. 4 shows a waveform of an optical signal output from a second transmission board in FIG. 1.

FIG. 4 shows an example of the optical signal output from the second optical transmission board 13, wherein the abscissa axis represents the process of time and the ordinate axis represents a variation in the optical intensity of optical signal. In the optical signal output from the second optical transmission board 13, the low-frequency sine-wave signal with the second frequency is superposed on a variation in the amplitude on the main signal. The first frequency is set to be lower than the second frequency. Both the first and second frequencies are sufficiently lower than the rate of the main signal. The degree of modulation of the main signal by each of the sine-wave signals is such that it does not affect the transmission of the main signal. For example, the degree of modulation is about 10%.

Figure 5:
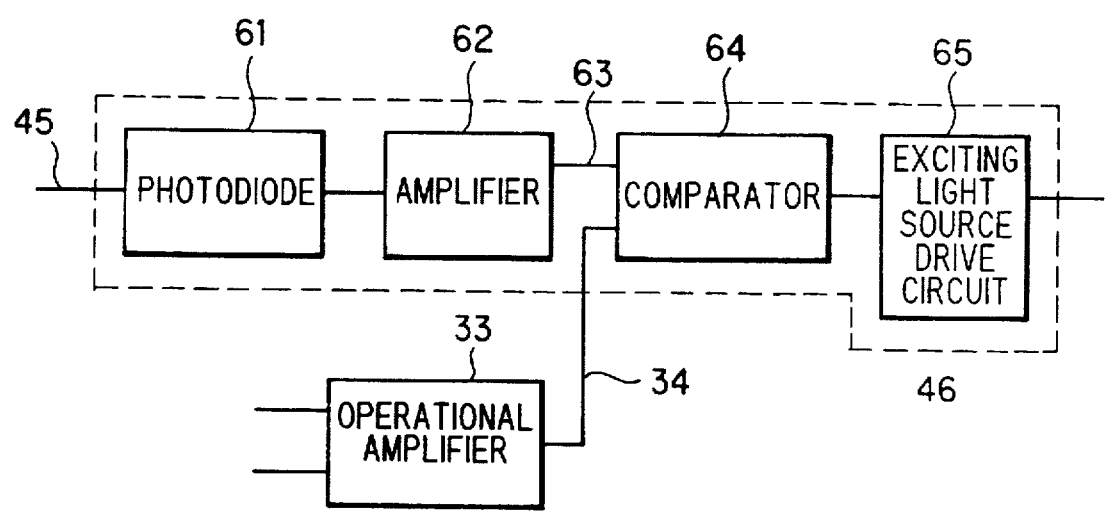
FIG. 5 is a block diagram showing a schematic circuit composition of a gain control circuit in FIG. 1.

FIG. 5 shows a composition of the gain control circuit 46 shown in FIG. 1. The optical signal 45 output from the optical divider 43 as shown in FIG. 1 is input into a photodiode 61 which outputs an electrical signal according to the optical intensity. The electrical signal output from the photodiode 61 is amplified and averaged by an amplifier 62 and is converted into a voltage signal 63 corresponding to an average value of optical power. Then, the voltage signal 63 output from the amplifier 62 and a reference voltage signal 34 output from an operational amplifier 33 of the signal number detecting circuit 23 are input into a comparator 64 in which these signals are compared. The output signal of the comparator 64 is input, as a control signal for controlling the amount of an exciting current, into an exciting light source drive circuit 65 which generates the exciting current supplied to the exciting light source 42 shown in FIG. 1.

In operation, the signal number detecting circuit 23 outputs the reference voltage signal 34 according to the number of the optical signals to be wavelength-multiplexed. For example, when the optical signals are output from both the first and second optical transmission boards 12, 13, both the outputs of the first and second output detectors 31, 32 are effective, and the adder 33 then outputs the reference voltage signal 34 with a voltage corresponding to the number of the two signals. For example, if the number of the two signals is two, the reference voltage signal 34 with a voltage of 6V is output. Then, the comparator 64 of the gain control circuit 46 of the optical fiber amplifier 21 compares the voltage 63 output from the amplifier 62 which corresponds to the optical intensity after the amplification and the reference voltage signal 34 of 6V.

On the other hand, if the optical signal is output from only the first optical transmission board 12 while the output signal of the second optical transmission board 13 is stopped, then the output of the first output detector 31 becomes effective and the output of the second output detector 32 becomes ineffective. Thus, the adder 33 outputs the reference voltage signal 34 with a voltage corresponding to the number of one signal. For example, in the case that this voltage is 3V, the comparator compares the voltage 63 corresponding to the optical intensity after the amplification and the reference voltage signal 34 of 3V.

As explained above, depending on the number of the optical signals to be wavelength-multiplexed, the voltage value of the reference voltage signal can be changed. Therefore, even if the number of the wavelength-multiplexed optical signals is varied, the optical intensity for one wavelength optical signal after amplification by the optical fiber amplifier 21 can be kept constant.

In the above-mentioned embodiment, there is provided a case that lights output from two optical transmission boards are multiplexed. However, lights output from three optical transmission boards may be multiplexed. In this case, it is necessary for optical wavelengths output from the respective optical transmission boards and frequencies of sine-wave signals to be superposed to be different from one another. Also, the signal number detecting circuit should be provided with bandpass filters and output detectors whose number corresponds to the number of optical transmission boards. The adder 33 sums up the outputs of these output detectors. The center frequency of each bandpass filter should be adapted to the frequency of the sine-wave signal to be superposed.

Though, in the above embodiment, the voltage value of the reference voltage signal is 6V or 3V, it is not limited thereto. Namely, a voltage value per a signal number can be an optionally predetermined value, and a voltage value obtained by multiplying this predetermined value by the signal number can be output from the adder.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A wavelength multiplexing optical transmission device, comprising:
    a plurality of optical transmission means, each of which comprises means for superposing a sine-wave signal with a different predetermined frequency on a respective main signal which represents information to be transmitted and means for outputting an optical signal whose optical intensity is varied according to an output signal of said superposing means;
    means for multiplexing said optical signals output from said plural optical transmission means;
    means for optically dividing said multiplexed optical signal into two optical signals;
    an electrical-optical transducing means which receives one of said two optical signals output from said optical dividing means and which outputs an electrical signal according to an optical intensity of said one received optical signal;
    means for extracting a signal component corresponding to each said sine-wave signal superposed by respective said superposing means from said electrical signal output from said electrical-optical transducing means;
    means for detecting whether or not said signal component extracting means has extracted the signal component for each said sine-wave signal;
    means for accumulating the number of said sine-wave signals that comprises an operational amplifier that outputs a voltage related to the number of said sine-wave signals detected by said detecting means;
    means for optically amplifying the other of said two optical signals output from said optical dividing means; and
    means for setting an amplification gain of said optical amplifying means, said amplification gain setting means comprising an optical intensity detecting means which outputs a voltage signal according to said intensity of said optical signal output from said optical amplifying means, means for comparing said voltage signal output from said optical intensity detecting means with said voltage output from said operational amplifier, and means for changing an amplification gain of said optical amplifying means based on a comparison by said comparing means such that said voltage signal output from said optical intensity detecting means coincides with said voltage output from said operational amplifier.

2. A wavelength multiplexing optical transmission device, according to claim 1, wherein:
    said amplification gain setting means changes said amplification gain of said optical amplifying means so that an optical intensity of an optical signal corresponding to one wavelength which is included in said optical signal output from said optical amplifying means is controlled to be a predetermined reference value.

3. A wavelength multiplexing optical transmission device, according to claim 1, wherein:
    said optical amplifying means comprises a rare-earth-element-doped fiber to which an optical signal to be amplified is input, and an exciting light source which supplies said fiber with exciting light, and
    said amplification gain setting means controls an intensity of said exciting light output from said exciting light source based on an intensity of an optical signal output from said fiber and on said number of said sine-wave signal accumulated by said signals number accumulating means.

* * * * *